G. KENNEDY.
COMPOUND BALL BEARING.
APPLICATION FILED JAN. 26, 1921.

1,433,014.

Patented Oct. 24, 1922.

INVENTOR.
George Kennedy
BY
ATTORNEY

Patented Oct. 24, 1922.

1,433,014

UNITED STATES PATENT OFFICE.

GEORGE KENNEDY, OF OAKDALE, CALIFORNIA, ASSIGNOR OF FORTY-NINE ONE-HUNDREDTHS TO SAMUEL S. STEWART, OF OAKDALE, CALIFORNIA.

COMPOUND BALL BEARING.

Application filed January 26, 1921. Serial No. 439,961.

*To all whom it may concern:*

Be it known that I, GEORGE KENNEDY, a citizen of the United States, residing at Oakdale, county of Stanislaus, State of California, have invented certain new and useful Improvements in Compound Ball Bearings; and I do declare the following to be a full, clear, and exact description of the same, reference being had to the accompanying drawings, and to the characters of reference marked thereon, which form a part of this application.

This invention relates to improvements in ball bearings such as are used extensively in automobiles, bicycles and motorcycles, and a variety of other forms of machines and mechanisms.

The principal object of my invention is to provide a compound ball bearing structure, which will be practically proof against non-functioning due to the breakage of any ball, as frequently and more or less inevitably occurs.

With the single ball races at present used, the breakage of one ball in the race from any reason, soon causes the jamming of the shaft or the breakage of further balls, resulting in the rapid deterioration of the race and the destroying of the easy running qualities which this form of bearing is intended to give.

By reason of my improved construction however, two concentrically alined sets of balls work together in unison, not only increasing the frictionless qualities of the bearing, but preventing any jamming from taking place, since if one race should jam, the other takes up the load without detriment to the jammed race or its contents.

A further object of the invention is to produce a simple and inexpensive device and yet one which will be exceedingly effective for the purposes which it is designed.

These objects I accomplish by means of such structure and relative arrangement of parts as will fully appear by a perusal of the following specification and claims.

In the drawings similar characters of reference indicate corresponding parts in the several views.

Figure 1:
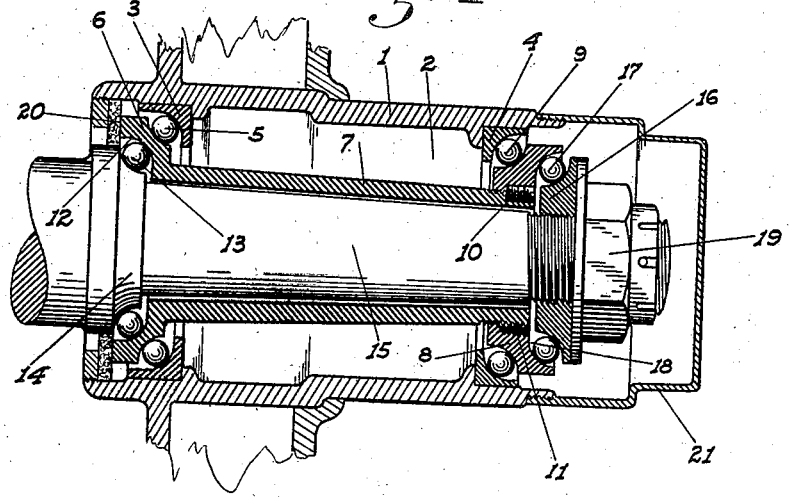
Fig. 1 is a sectional view of the front axle of an automobile, showing my improved bearing construction applied thereto as a tandem unit.

Referring now more particularly to the characters of reference on the drawings, and especially at present to Fig. 1, the numeral 1 denotes the hub of the wheel, in the bore 2 of which are fixed oppositely disposed races 3 and 4, situated adjacent the inner and outer ends of the hub respectively.

Balls 5 are seated in the inner race 3 and are engaged by a race-cone 6 formed at one end of a tubular sleeve 7, on the other and outer end of which is screwed another cone 8 engaging the balls 9 in the race 4. This cone may be adjusted on the sleeve and held at any desired point of setting by means of a set screw 10 seated half in the sleeve and half in the cone, the latter having a plurality of semicircular and tapped orifices or recesses as at 11 around its inner periphery, while the sleeve is only provided with a single complementary recess. In this manner the cone may be advanced or retracted on the sleeve to take up any lost motion in the inner and outer bearing members, and the cone may then be held at any point where one of the cone recesses registers with the sleeve recess to form the set screw hole.

Formed on the inside of the inner cone 6 is another race 12 carrying balls 13 engaged by a cone 14 formed at that end of the axle or spindle 15, the outer end of which is threaded to receive a tapped cone 16 engaging balls 17 seated in a race 18 formed on the inside of the cone 8 and in opposed relation to the race 12. Adjustment of the cone 16 and locking thereof is effected by means of a locknut 19 of any suitable form, it being noted that the adjustment of the first named or outer bearings is separate from that for the other bearings, all of which are of course concentric with the axle 15.

The bearings at the inner end of the spindle are protected from dirt and dust by means of any suitable felt packing or washer as at 20 while the outer end bearings are enclosed in a removable cap 21 of any desired form, secured to the hub 1.

Figure 2:
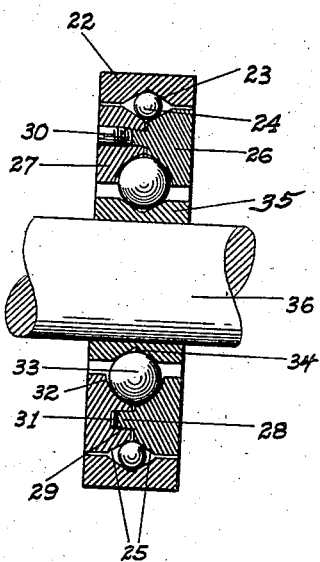
Fig. 2 is a similar view of a single compound bearing unit, suitable for rear axle use, or for general shafting purposes.

The type of bearing illustrated in Fig. 2 is built on the same principle as the structure just described, but forms a single compound unit of itself, of the annular type.

This structure comprises an outer ring 22, adapted to be fitted into a bearing box, and which is formed with an internal and centrally disposed recess 23 forming a race for balls 24, which also bear against similarly but oppositely disposed cones 25, formed half on each of male and female rings 26 and 27 respectively.

These rings are joined together and adjusted in the following manner:—

The member 26 has a threaded flange 28 adapted to screw into a tapped groove or recess 29 in the female member 27.

Seated in the member 27 and projecting therethrough in a plane parallel to the axis thereof and in alinement with the groove 29 and flange 28 is a set screw 30 adapted to project into any one of a plurality of peripheral notches or recesses 31 cut in the inner end of said flange. By this means, the members 26 and 27 may be adjusted so as to alter the spacing between the cones 25, and thus regulate the freedom of the balls. The inner faces of the rings 26 and 27 are formed with complementary recesses 32, serving as a race for balls 33, which are also engaged by a centrally grooved recess 34 formed in a sleeve 35 adapted to be driven onto an axle or shaft 36.

Adjustment of both sets of balls together in this type is had by means of the adjustable members 26 and 27, and it will be noted that when the parts are assembled, a complete and portable unit is formed from which the balls cannot be removed without taking the members 26 and 27 apart.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent, is:—

1. A tandem compound ball bearing structure comprising a pair of fixed and oppositely disposed races, balls seated therein, a sleeve provided with a fixed cone on one end and an adjustable cone on the other, both said cones being complementary to the races, races provided in the inner faces of said cones, balls in said races, and a spindle provided with a fixed cone on one end and with an adjustable cone on the other end, said latter cones being complementary to the last named races and engaging the balls therein, any adjustment being made by the cones themselves.

2. A tandem ball bearing structure comprising a pair of fixed and oppositely disposed races, balls seated therein, a sleeve provided with a fixed cone on one end and with an adjustable cone on the other end, said cones being complementary to the respective races, means for locking said adjustable cone on the sleeve, races provided on the inner faces of said cones, balls in said races, and a spindle provided with a fixed cone on one end and with an adjustable cone on the other end, said last named cones being complementary to the inner races, any adjustment being made by the cones themselves.

In testimony whereof I affix my signature.

GEORGE KENNEDY.